G. H. TABER, Jr.
MANUFACTURE OF GASOLENE.
APPLICATION FILED MAY 24, 1919.
1,363,487. Patented Dec. 28, 1920.
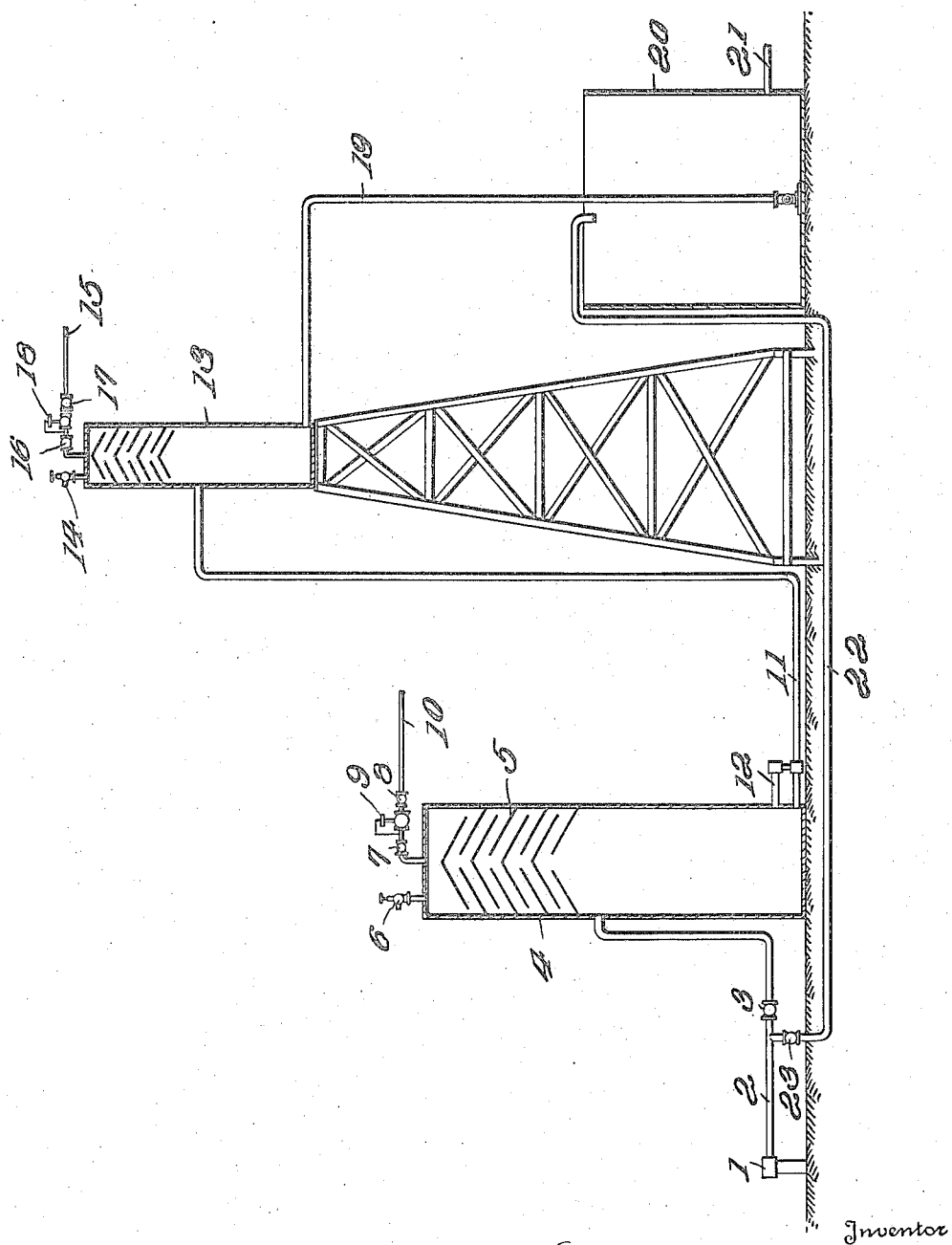

UNITED STATES PATENT OFFICE.

GEORGE H. TABER, JR., OF TULSA, OKLAHOMA, ASSIGNOR TO MEXICAN SINCLAIR PETROLEUM CORPORATION, OF NEW YORK, N. Y., A CORPORATION OF NEW YORK.

MANUFACTURE OF GASOLENE.

1,363,487. Specification of Letters Patent. Patented Dec. 28, 1920.

Application filed May 24, 1919. Serial No. 299,392.

*To all whom it may concern:*

Be it known that I, GEORGE H. TABER, Jr., a citizen of the United States, residing at Tulsa, in the county of Tulsa and State of Oklahoma, have invented certain new and useful Improvements in the Manufacture of Gasolene, of which the following is a specification.

This invention relates to the manufacture of gasolene; and it comprises a method of obtaining what is known as casing head gasolene from oil well gas wherein oil coming from the well under well pressure is stripped of a portion, but not all, of the accompanying gas in a suitable stripping apparatus under a relatively high pressure, and the oil is then again stripped of gas at a much lower pressure, such lower pressure, in some instances being less than atmospheric pressure; gasolene being then recovered from the second portion of gas so removed from the oil by any of the usual gasolene recovering methods; all as more fully hereinafter set forth and as claimed.

As is well known, the gas delivered from oil wells frequently contains substantial amounts of vapors of hydrocarbons which are liquid at the ordinary temperature but are so volatile as to vaporize and go forward with the gas. These hydrocarbons which include the various pentanes, butanes, heptanes, etc., are frequently recovered from such gas by compression of the gas or washing or scrubbing with an oil which will absorb these hydrocarbons from the gas. Gasolene so recovered is commercially known as casing head gasolene.

The amount of gasolene which can be held in vapor form by gas depends upon the pressure, and temperature; the higher the pressure the less being the amount of these vapors which can exist and conversely. Gas in contact with the oil in the well will take up any amount of gasolene from the oil inversely corresponding to the well pressure. If both oil and gas be taken out of the well and the well pressure reduced to the ordinary pressure, the gas will take up very much more gasolene. With gas and oil at high pressure there is less gasolene in the gas and more in the oil than where both gas and oil are at low pressure.

The present invention is predicated on the above facts, and includes taking the oil and gas together from the well and while still under heavy pressure releasing a fraction, but not all, of the gas. This gas will carry very little gasolene. It may be freed of this gasolene by washing with heavy oil or by the well known absorption processes, or may be burnt, used in an engine, etc. Regaining gasolene from it by pressure, or by pressure and chilling combined, is not ordinarily practicable where the well pressure is high. After removing a fraction of the gas in the manner stated the oil may now be sent through another stripping apparatus and the remaining gas released. Release may be at the ordinary pressure or below. The gas now obtained is relatively very rich in gasolene but there is not much of it and a comparatively small plant suffices to recover the gasolene from it. The gas obtained in this second stripping may be simply compressed to a high pressure, the liquefied gasolene removed and the residual gas sent to join that released in the first stripping. Or the gasolene contained my be obtained by scrubbing with oil, the ordinary absorption process or by refrigeration or by a combination of all three expedients. Gas of the first stripping may be used to operate a pump to compress gas of the second stripping or be put through an expansion engine for refrigeration purposes.

As a typical embodiment of my invention I may cite its application to one particular well which produces large quantities of gas and oil under a pressure around 500 pounds per square inch. By stripping off the gas from the oil at the well pressure or even considerably lower, say down to about 100 pounds the released gas carries very little gasolene. In this particular instance if released at 100 pounds it will carry about 0.3 gallons of gasolene per 1000 cubic feet. On the other hand, if the release is effected at atmospheric pressure, the gas will carry forward about 3.3 gallons of gasolene per 1000 cubic feet. By releasing the gas at the well pressure of 500 pounds it carries practically no gasolene. This oil well produces about 20,000 barrels of oil and 6,000,000 cubic feet of gas per day. By releasing all the gas at atmospheric pressure, obviously the gasoline recovery plant must handle 6,000,000 feet of gas per day in order to recover 19,800 gallons of gasolene. When on the other hand, a portion of this gas is released at 100 pounds pressure, it will only carry 0.3 gallon per 1000 cubic feet. If the amount so released be 80 per cent. 4,800,000 cubic feet will be drawn off carrying 1,440 gallons of gasolene. In so doing 20 per cent. of the gas will be left with the oil or 1,200,000 feet of gas carrying 18,360 gallons of gasolene. With a first release of 80 per cent. a gasolene recovery plant able to handle 1,200,000 feet of gas per day will give 18,360 gallons of gasolene, while if all the gas were released at the low pressure the plant would necessarily be five times as large with an increased production of, theoretically, not to exceed 1,440 gallons. Actually, the extra recovery would not be as large as this for the reason that it is not practical to remove all the gasolene, although this might be accomplished by releasing the gas under a pressure lower than atmospheric.

Any convenient apparatus for releasing gas from the oil in two stages may be used for the present purposes. The pressure differentiation between the two separations of course depends upon the well pressure, the amount of gasolene and many other conditions. Ordinarily, however, I aim to release the major fraction of the gas at the high pressure, leaving the minor fraction to be treated for gasolene recovery. The minor fraction cannot of course be made indefinitely small since the amount of gasolene which can be carried by gas at the ordinary pressure, or whatever pressure is adopted for the second release, is limited by the volatility of the gasolene.

In the accompanying illustration I have shown, more or less diagrammatically, certain apparatus within the present invention and adapted for use in the performance of the described process. In this showing The figure is a view in central vertical section, certain parts being shown in elevation.

In this showing element 1 is a source of oil and gas from a well under pressure. The oil and gas are taken by conduit 2 valved at 3 into a releasing tower 4. As shown, this is a casing containing a series of staggered baffle plates or shelves 5. It is provided with safety valve 6 and with a pair of gate valves 7 and 8, intermediate which is a pressure regulating valve 9 which may be set to any pressure desired from 25 to 150 pounds (more or less), according to circumstances. Gas passing this pressure regulating valve is led to any desired point of disposition by lean gas outlet 10. The oil and gas led into this releasing device separate and the gas passing upward is stripped of entrained oil by the baffle plates. The oil from which much, but not all, of the gas has been removed leaves the releasing casing through outlet 11, a constant level regulator 12 being provided. The oil and residual gas pass to another releasing device 13 of similar construction. This is provided with safety valve 14 which may be set at any desired pressure, say about 10 pounds. It is also provided with rich gas line 15 provided with gate valves 16 and 17 intermediate which is a pressure regulating device 18. Suitable suction means (not shown) may be connected to this rich gas outlet to produce pressure less than atmospheric within the releasing device. The oil, stripped of its remaining gas passes through conduit 19 into oil storage reservoir or flow tank 20 having outlet 21. In the structure as shown a bypass 22 valved at 23 is provided around the releasing devices for use in emergency.

What I claim is:

1. In the manufacture of gasolene from oil well gas the process which comprises withdrawing oil and gas from the well under pressure, releasing a portion but not all of the gas at a pressure sufficiently high to obviate substantial volatilization of gasolene, releasing a second portion of the gas at a pressure sufficiently low to permit volatilization of gasolene and extracting gasolene from said second portion.

2. In the manufacture of gasolene from oil well gas the process which comprises withdrawing oil and gas from the well under high pressure, releasing a portion but not all of the gas at a less pressure, such pressure being not lower than 100 pounds, releasing a second portion at a still lower pressure and extracting gasolene from said second portion.

3. In the manufacture of gasolene from oil well gas the process which comprises withdrawing oil and gas from the well under high pressure, releasing a portion but not all of the gas at a relatively high pressure, such pressure being sufficiently high to prevent substantial volatilization of gasolene, releasing a second portion at a pressure less than atmospheric and extracting gasolene from said second portion.

4. In the manufacture of gasolene from oil well gas the process which comprises withdrawing oil and gas from the well under high pressure, releasing a portion but not all of the gas at a less pressure, such pressure being sufficiently high to prevent substantial volatilization of gasolene, and then releasing a second portion at a still lower pressure and extracting gasolene from the second portion.

5. In the manufacture of gasolene from oil well gas the process which comprises withdrawing oil and gas from the well under high pressure, releasing the pressure in diminishing stages, such pressure in an initial stage being sufficiently high to prevent a substantial volatilization of gasolene, and extracting gasolene from the gas in one of the latter reduced pressure stages.

In testimony whereof, I affix my signature hereto.

GEORGE H. TABER, JR.

Witnesses:
J. M. BELLAMY,
THOMAS R. CLIFT.